US012663795B2

(12) United States Patent
Samuelsson et al.

(10) Patent No.: US 12,663,795 B2
(45) Date of Patent: Jun. 23, 2026

(54) SYSTEM FOR COLLISION PREVENTION

(71) Applicant: Volvo Autonomous Solutions AB, Gothenburg (SE)

(72) Inventors: Ted Samuelsson, Kolbäck (SE); Markus Rombach, Gothenburg (SE)

(73) Assignee: VOLVO AUTONOMOUS SOLUTIONS AB, Gothenburg (SE)

( * ) Notice: Subject to any disclaimer, the term of this patent is extended or adjusted under 35 U.S.C. 154(b) by 25 days.

(21) Appl. No.: 17/759,581

(22) PCT Filed: Jan. 30, 2020

(86) PCT No.: PCT/EP2020/052297
§ 371 (c)(1),
(2) Date: Jul. 27, 2022

(87) PCT Pub. No.: WO2021/151492
PCT Pub. Date: Aug. 5, 2021

(65) Prior Publication Data
US 2023/0092918 A1 Mar. 23, 2023

(51) Int. Cl.
G05D 1/00 (2024.01)
G05D 1/693 (2024.01)
G08G 1/16 (2006.01)

(52) U.S. Cl.
CPC ........... G05D 1/0289 (2013.01); G08G 1/164 (2013.01); G05D 1/693 (2024.01)

(58) Field of Classification Search
CPC ....... G05D 1/0289; G05D 1/693; G08G 1/164
USPC ........................................................ 701/23
See application file for complete search history.

(56) References Cited

U.S. PATENT DOCUMENTS

| | | | | | |
|---|---|---|---|---|---|
| 6,134,493 | A | * | 10/2000 | Kaneko | G05D 1/0289 |
| | | | | | 701/25 |
| 9,595,196 | B1 | * | 3/2017 | Hiranaka | G08G 1/164 |
| 2002/0143461 | A1 | * | 10/2002 | Burns | G05D 1/0297 |
| | | | | | 701/23 |
| 2009/0118889 | A1 | | 5/2009 | Heino et al. | |
| 2009/0201199 | A1 | * | 8/2009 | Preston | G01S 19/34 |
| | | | | | 342/357.44 |
| 2013/0268138 | A1 | * | 10/2013 | Moughler | G05D 1/027 |
| | | | | | 701/2 |
| 2014/0172223 | A1 | * | 6/2014 | Murphy | G05D 1/0289 |
| | | | | | 701/25 |

(Continued)

FOREIGN PATENT DOCUMENTS

| | | |
|---|---|---|
| CN | 105644559 A | 6/2016 |
| CN | 106941781 A | 7/2017 |
| CN | 108411820 A | 8/2018 |

(Continued)

OTHER PUBLICATIONS

English Translation of WO-2014058263-A1 (Year: 2014).*

(Continued)

*Primary Examiner* — Ramya P Burgess
*Assistant Examiner* — Preston Jay Miller
(74) *Attorney, Agent, or Firm* — Jeffri. A. Kaminski; Venable LLP

(57) ABSTRACT

A computer system for preventing collisions between a first and a second vehicle operating at a work site is described, along with a corresponding computer implemented method and a computer program product.

14 Claims, 3 Drawing Sheets

(56) References Cited

U.S. PATENT DOCUMENTS

2014/0222247 A1 * 8/2014 Friend .................. G05D 1/0276
701/2

FOREIGN PATENT DOCUMENTS

| | | | |
|---|---|---|---|
| CN | 108646264 A | 10/2018 | |
| CN | 109829367 A | 5/2019 | |
| WO | WO-2014058263 A1 * | 4/2014 | .............. G08G 1/04 |

OTHER PUBLICATIONS

International Search Report and Written Opinion in corresponding International Application No. PCT/EP2020/052297 mailed Jul. 7, 2020 (14 pages).

European Communication pursuant to Article 94(3) EPC dated Mar. 13, 2024 in corresponding European Patent Application No. 20703006. 5, 6 pages.

Chinese Office Action dated Nov. 28, 2024 in corresponding Chinese Patent Application No. 202080094014.8, 22 pages.

European Communication pursuant to Article 94(3) EPC dated Jun. 26, 2025 in corresponding European Patent Application No. 20703006. 5, 7 pages.

* cited by examiner

204

202          200

μ

310          300

320

102          104

D

P1

SP1

SYSTEM FOR COLLISION PREVENTION

CROSS-REFERENCE TO RELATED APPLICATIONS

This application is a U.S. National Stage application of PCT/EP2020/052297, filed Jan. 30, 2020 and published on Aug. 5, 2021, as WO 2021/151492, all of which is hereby incorporated by reference in its entirety.

TECHNICAL FIELD

The present disclosure relates to a computer system for preventing collisions between a first and a second vehicle operating at a work site. The present disclosure also relates to a corresponding computer implemented method and to a computer program product.

BACKGROUND

In connection with transportation of e.g. loads at construction site or the like, working machines in the form of articulated haulers, wheel loaders or trucks are frequently used. In its simplest configuration, the machines are arranged to load a platform of the vehicle, or a container or the like arranged on the platform of the vehicle, at a loading position of the construction site and drive to an unloading position of the construction site, located at a distance from the loading position, where it unloads the platform of the vehicle.

Recently there have been great advances in the semi and fully autonomous operation of such working machines, effectively providing operator assistance and safety functions, such as general obstacle detection, pedestrian detection, front and rear collision warning between working machines, etc. Such a working machine typically makes use of a plurality of sensors that are configured to detect information about an environment surrounding the vehicle.

An example of an interesting solution in regards to the reduction of collisions between working machines operating in a work site is presented in US2002143461. Specifically, US2002143461 suggests dividing the work site into different zones, where the working machines are only allowed to enter into a specific zone if it has successfully received an allowance from a remote server to do so. Generally, two different working machines are not allowed to enter into the same zone at the same time.

Even though the solution proposed in US2002143461 greatly reduces the risks for collision between different working machines, it is greatly dependent on an always functioning wireless communication between the working machines and the remote server. With the above in mind, there appears to be room for further improvements, allowing for an increased robustness of the scheme used for ensuring reducing the collision between

SUMMARY

According to an aspect of the present disclosure, the above is at least partly alleviated by a computer system for preventing collisions between a first and a second vehicle operating at a work site, the system comprising a control unit arranged in communication with the first and the second vehicle, wherein the control unit is adapted to receive a first information package from the first vehicle, the first information package comprising an indication of a first location of the first vehicle, identify a possible communication disruption between the first vehicle and the control unit, and transmit, if such a possible communication disruption has been identified, a second information package to the second vehicle, the second information package comprising an instruction to the second vehicle for not entering within a predetermined distance of a first safety position, the first safety position being based on the first location of the first vehicle.

The overall idea with the present disclosure is to implement a scheme for reducing the collision risk between the first and the second vehicle, also in cases where e.g. the first vehicle is unable to relay its present location to a control unit. The control unit may for example in one embodiment be comprised with a server arranged to at least partly manage the operation of the first and the second vehicle at the work site. That is, in case e.g. the first vehicle loses communication with the server, then the server informs the second vehicle that it is not allowed to enter within a predetermined distance from e.g. the position where the first vehicle lastly was in communication with the server. An advantage following the present disclosure is thus an improved security when vehicles are operating at a work site.

Within the context of present disclosure, it should be understood that the expression "information package" should be interpreted broadly and may relate to any form of a set of information that is to be transmitted between the vehicles and the control unit. In a typical implementation at least part of the transmission of information between the vehicles and the control unit is in wireless form, using any form of known of future communication protocol.

Furthermore, the expressions "first location" and "first safety position" both relates to a last known position for the first vehicle. In some implementations the first location may be a location e.g. determined using a geolocation arrangement. Such a geolocation arrangement may for example comprise a GPS receiver or a local positioning arrangement at the work site, such as for example a Wi-Fi positioning system. It may, as understood by the skilled addressee, be necessary to use an alternative to satellite navigation in case the vehicles are operating underground, such as for example in a mine or similar. In some embodiments, for example when the geolocation arrangement is expected to have an in comparison high reliability, to allow the first safety position to correspond to the first location. However, in some other embodiments, such as when the geolocation arrangement is expected to have an in comparison low reliability, to allow the first safety position to also include a "safety margin". The safety margin could for example be dependent on an expected unreliability of the geolocation arrangement. As such, when the first safety position to also include the safety margin, then the first safety position may be seen as a "geographical area" rather than just a single geographical position.

Furthermore, it should in line with the present disclosure be understood that use of expression "predetermined distance" in relation to the first safety position should be treated broadly. That is, in one embodiment the control unit will just inform (by means of the second information package) the second vehicle that it should stay away a predetermined distance from the first safety position. That said, the control unit must in such an embodiment not necessarily inform the second vehicle about an absolute or approximate length of predetermined distance. Rather, the control unit may just inform the second vehicle that it should stay said predetermined distance from the first safety position and leave to the second vehicle to decide on the length of the predetermined distance. That said, the predetermined distance may as an alternative be set by the control unit and communicated to the second control unit.

Furthermore, in one embodiment it may be possible to allow the predetermined distance is dependent on a type of the first vehicle. That is, different type of vehicles may e.g. have different stopping distances, possibly dependent on a weight of the vehicle. Other parameters may also have impact on the selection of the predetermined distance, such as tyre types, the type of ground material where the vehicles are travelling, etc. The predetermined distance may also be dependent on the type of the first vehicle, including for example an expected travelling speed for the first vehicle. That is, it may be so that the first vehicle is continuing to move at the work site, meaning that the predetermined distance potentially may increase over time.

Using the first safety position and the predetermined distance is may be possible to define a permission zone for the second vehicle at the work site. The permission zone may as such be seen, in part, as an inverse of the area where the first vehicle is expected to be, based on its lastly known location (i.e. the first location).

In one embodiment the control unit may further be adapted to identify a re-established communication between the first vehicle and the control unit, receive a third information package from the first vehicle, the third information package comprising an indication of a second location of the first vehicle, determine a difference between the first and the second location for the first vehicle, transmit, only if the determined difference is larger than a first threshold, a fourth information package to the second vehicle, the fourth information package comprising an instruction to allow the second vehicle to enter within the predetermined distance of the first safety position. Such an implementation may for example allow for a reduction in the number of information packages transmitted at the work site, since the fourth information is only transmitted in case the first vehicle has moved e.g. a substantial distance from the first portion.

Preferably, the first and the second vehicle are controlled to operate along a common route at the work site, the first vehicle preceding the second vehicle, and the second information package comprises an instruction to the second vehicle for not passing the first safety position. Accordingly, in such an implementation the second vehicle will eventually have to stop along the common route since it may be undesirable to have the second vehicle operating outside the common route.

In a possible embodiment of the present disclosure the control unit may be adapted to identify the communication disruption by determining a duration since the last received indication of the location of the first vehicle, determining if the determined duration is larger than a second threshold. Possibly, the second threshold may be selected to be less than 1 minute, preferably less than 30 second and most preferably less than 10 seconds. Such an implementation may for example be used for quickly identifying when a possible communication disruption and to thereafter act such that the second vehicle is informed.

In a preferred embodiment the first and the second vehicle are working machines. Such a working machine may for example include any form of mobile equipment used at a work site. The vehicles may furthermore be at least one of a pure electrical vehicle (PEV) and a hybrid electric vehicle (HEV).

In a preferred embodiment the vehicles are semi- and or fully autonomous vehicles, as will be further elaborated below in relation to the detailed description. It should however be understood that the vehicles may be vehicles operated by a human, where the vehicles may be equipped with e.g. a user interface (visual and/or audio based) to be used for directing the content of the second information package to the human operator.

In some implementations the control unit forms part of a common server arranged remotely from the first and the second vehicle. Such a server may for example be a work site server. That said, in some other embodiments the control unit is provided as an onboard component of the second vehicle.

The computer system as discussed above preferably forms part of a work site arrangement, further comprising the first and the second vehicle.

According to another aspect of the present disclosure there is provided a computer implemented method for preventing collisions between a first and a second vehicle operating at a work site, the first and the second vehicle arranged in communication with a control system comprising a control unit, wherein the method comprises the steps of receiving, at the control unit, a first information package from the first vehicle, the first information package comprising an indication of a first location of the first vehicle, identifying a possible communication disruption between the first vehicle and the control unit, and transmitting, if such a possible communication disruption has been identified, a second information package to the second vehicle, the second information package comprising an instruction to the second vehicle for not entering within a predetermined distance of a first safety position, the first safety position being based on the first location of the first vehicle. This aspect of the present disclosure provides similar advantages as discussed above in relation to the previous aspect of the present disclosure.

According to a further aspect of the present disclosure there is provided a computer program product comprising a non-transitory computer readable medium having stored thereon computer program means for operating a control system for preventing collisions between a first and a second vehicle operating at a work site, the system comprising a control unit arranged in communication with the first and the second vehicle, wherein the computer program product comprises code for receiving, at the control unit, a first information package from the first vehicle, the first information package comprising an indication of a first location of the first vehicle, code for identifying, using the control unit, a possible communication disruption between the first vehicle and the control unit, and code for transmitting, if such a possible communication disruption has been identified, a second information package to the second vehicle, the second information package comprising an instruction to the second vehicle for not entering within a predetermined distance of a first safety position, the first safety position being based on the first location of the first vehicle. Also this aspect of the present disclosure provides similar advantages as discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1:
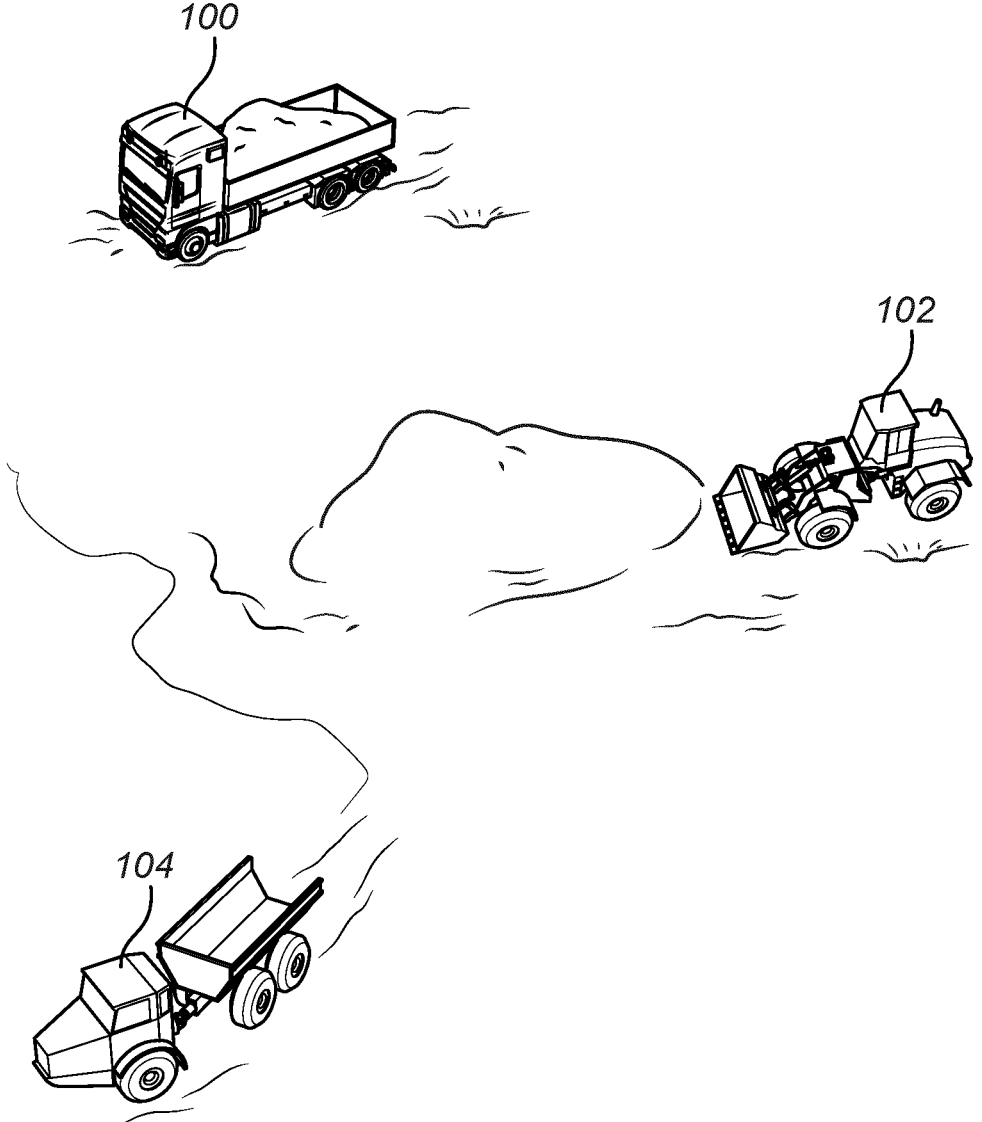
FIG. 1 illustrates a truck, a wheel loader and an articulated hauler that may form part of a work site arrangement according to the present disclosure.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figures 2, 3:
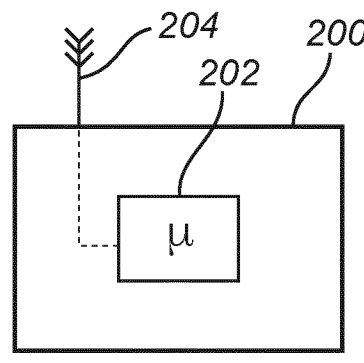
FIG. 2 illustrates a conceptual computer system in accordance to a currently preferred embodiment of the present disclosure.
FIG. 3 exemplifies the work site arrangement where the computer system according to an embodiment of the present disclosure is used for minimizing collision between vehicles.

Referring now to the drawings and to FIG. 1 in particular, there is depicted an exemplary vehicle, here illustrated as a truck 100, that may be provided with information using a computer system 200 (as shown in FIG. 2) in line with the present disclosure for collision prevention. The concept of the present disclosure may also be used with other vehicles, such as a wheel loader 102 and an articulated hauler 104. The concept in line with the present disclosure may also be used in relation to any other form of movable equipment operating at a work site, such as e.g. a car, a bus, any form of construction equipment, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

As will be apparent from the discussion below, it is preferred to equip the vehicle in communication with e.g. a radionavigation system, for example including a GPS receiver and possibly also a map database e.g. holding map navigation data relating to a work site where the vehicle 100, 102, 104 is travelling. Based on information from the radionavigation system, the vehicle 100, 102, 104 may swiftly communicate its current geographical position when needed in line with the present disclosure.

FIG. 2 shows a conceptual and exemplary implementation of the computer system 200, comprising a control unit 202 adapted for implementing the collisions prevention scheme according to the present disclosure. The computer system 200 may in some embodiments comprise a transceiver 204 connected to the control unit 202, allowing communication to take place with a first and a second vehicle. For example, the first and the second vehicle may be manifested by the wheel loader 102 as shown in FIG. 1B and the articulated hauler 104 as shown in FIG. 10. The first and the second vehicle may as such be provided with a corresponding transceiver (not shown) for communicating with the computer system 200. The communication between the computer system 200 and the first and the second vehicle is preferably performed in a wireless manner. For example, the communication is a wireless network communication using any form of known or future communication protocol. Possible known communication protocol that may be used include e.g. a vehicle to infrastructure (V2I) connection, device-to-device (D2D) communication techniques are also possible. However, one exemplary existing technique that is specifically suitable for V2I applications is the IEEE standard 802.11p, based on the PHY and MAC layer of 802.11, i.e. OFDM and CSMA, respectively. Data broadcasts of IEEE 802.11p include information related to the position of the source, e.g. a vehicle. OFDM and CSMA refer to Orthogonal Frequency Division Multiplex and Carrier Sensing Multiple Access, respectively. It may however also or additionally be possible to use network communications using e.g. one of satellite, Wi-Fi, radio service, or any form of cellular signals.

In a possible embodiment of the present disclosure, the computer system 200 is implemented as part of a server. The server could possibly be a so-called cloud server. As such, the server must not necessarily be arranged adjacently to the work site but may be arranged essentially at any position for performing the concept according to the present disclosure, as long as the server may communicate with the first and the second vehicle. It may however be preferred to arrange the computer system 200 (or server) at the work site, thereby possibly minimizing communication disruptions, since possibly the first and the second vehicle may be directly connected to the computer system 200 (or server). It should also be noted that the computer system 200 in some possible embodiment may be arranged onboard e.g. the second vehicle.

For reference, the control unit 202 may in turn be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

During operation of the computer system 200 for controlling the operation of e.g. the vehicles 102, 104, with further reference to FIG. 3, the first 102 and the second 104 vehicle are seen as operating at the work site 300. The computer system 202 is shown as comprised with a locally arranged server 310, also arranged at the work site 300. In the illustrated embodiment, the vehicles 102, 104 are seen as travelling along a predetermined route 320 at the work site 300, where the first vehicle 102 is shows as travelling ahead of the second vehicle 104. It should however be understood that the vehicles 102, 104 alternatively may travel "freely" at the work site 300 (or a portion of the work site 300). The concept according to the present disclosure may be equally implemented and useful in both situations.

Figure 4:
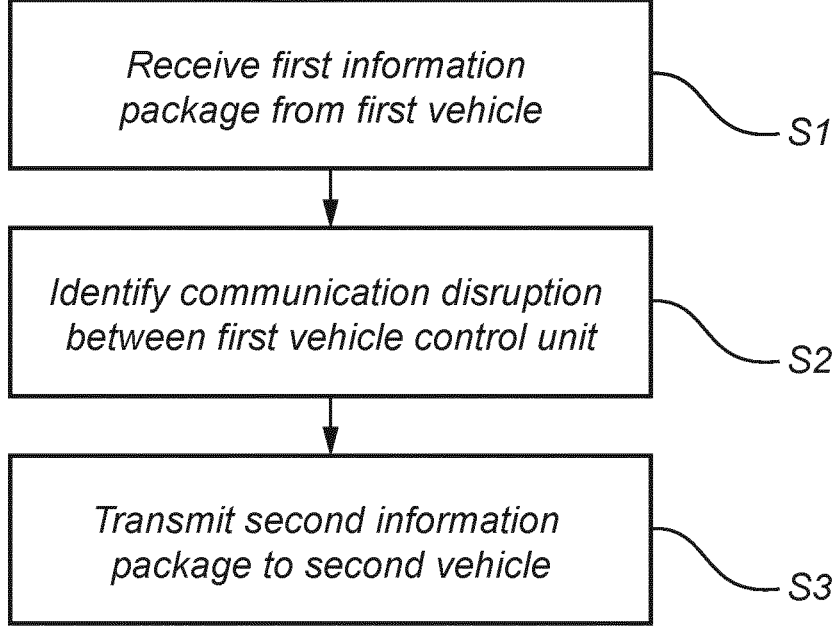
FIG. 4 illustrates the processing steps for performing the method according to the present disclosure.

With further reference to FIG. 4, the control unit 202 is adapted to receive, S1, a first information package from the first vehicle (here illustrated as vehicle 102), the first information package comprising an indication of a first location, P1, of the first vehicle 102. For example, the first vehicle 102 may implement a scheme where it frequently "reports" its current position at the work site 300 to the computer system 200. Frequently reporting the current position may for example be to arrange the first vehicle 102 to send its location/position every 10 second-5 minutes, depending on the possible implementation. Selection on how often to send the location may possibly be dependent on a number of vehicles operating at the work site 300 and/or the size of the work site 300. Optionally, the first vehicle 102 may send its location every 50-500 meters. That is, once the first vehicle 102 has moved 50-500 meters it will send its current location to the computer system 200 (and thus received by the control unit 202). It should be understood that the disclosed time range and distance range is purely as examples. That is, other time ranges or distance ranges are possible and within the scope of the present disclosure.

The current position for the first vehicle 102 is for example received from the above mentioned radionavigation system arranged as an on-board component of the first vehicle 102. Accordingly, in some embodiments the first information package comprises longitude and latitude coordinates for the first vehicle 102. The first information package may optionally also comprise information relating to an altitude/elevation above sea level.

It may be advantageous to allow also the second vehicle 104 to send its current location to the computer system 202.

Once the control unit 202 has received the location of the first vehicle 102, it may correlate the location of the first vehicle 102 with e.g. a map of the work site 300. The same is preferably valid once the control unit has received the location of the second vehicle 104. The combined information may in some implementations be frequently broadcasted from the computer system 200 to possibly all vehicles at the work site 300.

The control unit 202 is also, in line with the present disclosure, adapted to identify, S2, a possible communication disruption between the first vehicle 102 and the control unit 202. In one possible embodiment of the present disclosure, the control unit 202 determines a duration (time) since the lastly received first information package from the first vehicle 102. That is, if for example the time since the lastly received first information package from the first vehicle 102 is longer than e.g. 20 seconds-5 minutes, the control unit 202 may draw a conclusion that e.g. some issues relate to the ability of the first vehicle 102 to transmit information to the control unit 102. Other implementations for determining the possible communication disruption between the first vehicle 102 and the control unit 202 may of course be possible, for example including receiving a specific message at the control unit 202 from the first vehicle 102 using backup communication means about a possible error with the first vehicle 102.

In line with the present disclosure, in case the control unit 202 has identified that there is a possible communication disruption between the first vehicle 102 and the control unit

202, then the control unit 202 transmits, S3, a second information package to the second vehicle 104. The second information package may possibly be structured and transmitted in a corresponding manner as discussed above in relation to the first information package. Preferably, the second information package comprising an instruction to the second vehicle 104 for not entering within a predetermined distance, D, of a first safety position, SP1, the first safety position, SP1, being based on the first location, P1, of the first vehicle 102.

As discussed above, the first safety position, SP1, may in one embodiment be directly (or at least essentially) corresponding to the first location, P1. That is, the first safety position, SP1, may be defined as having the same e.g. longitude and latitude coordinates and optionally information relating to an altitude/elevation above sea level, of the lastly known position where the first vehicle 102. However, in some other embodiments it may be desirable to allow the first safety position, SP1, to also include a safety margin for the first location, P1. As an example, in case it is likely that the radionavigation system comprised with the first vehicle 102 has an undesirably large uncertainty, then it may be suitable to allow this to be taken into account when determining the first safety position, SP1. In such a case, the first safety position, SP1 may be defined as an area where the first vehicle 102 likely was located when it transmitted its last location. Possibly, such a safety margin could possibly be 10-100 meters.

Furthermore, in some embodiments the second information package may include information about a value for the predetermined distance, D. That is, in one embodiment the control unit 202 may explicitly communicate the predetermined distance, D to the second vehicle 104. Possibly, the predetermined distance may be 10-100 meters. Other distances are of course possible and within the present disclosure.

However, in another embodiment the control unit 202 only communicate that the second vehicle should not be entering within the predetermined distance, D, of the first safety position, SP1. That is, the control unit 202 may just communicate the fact that the second vehicle 104 should stay away from the first safety position, SP1, but without communicating a value relating to the predetermined distance, D. In such an embodiment the predetermined distance, D, may possibly be pre-set at the second vehicle 104, or in another embodiment dynamically determined based on an expected stopping distance for the second vehicle 104. The expected stopping distance may in turn be dependent on one or a plurality of a current speed, load, tires, a ground surface at the work site 300, etc. generally, it is however desired that the second vehicle 104 stays at least 10-100 meters away from the first safety position, SP1.

Furthermore, it may also be possible to allow the second information package to include information about when the last position for the first vehicle 102 was received at the control unit 202. This information could optionally be used for determining the predetermined distance, D.

As mentioned above, in the implementation as shown in FIG. 3, the second vehicle 104 is travelling behind the first vehicle 102 at a predetermined route 320 at the work site 300. Accordingly, if the second vehicle 104 receives second information package with an instruction to not enter within the predetermined distance (D) of the first safety position (SP1), then as a result the second vehicle 104 will come to a stop. That is, the second vehicle 104 will not pass the first vehicle 102. However, in case the vehicles 102, 104 are travelling freely at the work site 300, then the first safety position (SP1) and the predetermined distance (D) may be used by control means comprised with the second vehicle 104 for amending its route (if possible) to not entering closed the first safety position (SP1) then what is dictated by the predetermined distance.

Furthermore, once the control unit 202 again receives a new or updated location for the first vehicle 102, it may update the second vehicle 104, such that the second vehicle 104 again may proceed forward (such as in the case where the vehicles 102, 104 are travelling along the predetermined route 320 at the work site 300.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

10

The invention claimed is:

1. A computer system for preventing collisions between a first and a second vehicle operating at a work site, the system comprising a control unit arranged in communication with the first and the second vehicle, wherein the control unit is adapted to:
   receive a first information package from the first vehicle, the first information package comprising an indication of a first location of the first vehicle,
   identify a communication disruption between the first vehicle and the control unit,
   form, upon identification of the communication disruption, a permission zone for the second vehicle based on the first location of the first vehicle and a maximum stopping distance for the second vehicle, and
   transmit a second information package to the second vehicle, the second information package comprising an instruction to the second vehicle for not entering the permission zone wherein the second vehicle is controlled to comply with the instruction by altering its route to avoid entering the permission zone, thereby restricting movement to avoid collision between the first and the second vehicle.

2. The system according to claim 1, wherein the control unit is further adapted to:
   identify a re-established communication between the first vehicle and the control unit,
   receive a third information package from the first vehicle, the third information package comprising an indication of a second location of the first vehicle,
   determine a difference between the first and the second location for the first vehicle,
   transmit, only if the determined difference is larger than a first threshold, a fourth information package to the second vehicle, the fourth information package comprising an instruction to allow the second vehicle to enter the permission zone.

3. The system according to claim 1, wherein the control unit is adapted to identify the communication disruption by:
   determining a duration since the last received indication of the location of the first vehicle,
   determining if the determined duration is larger than a second threshold.

4. The system according to claim 3, wherein the second threshold is less than 1 minute.

5. The system according to claim 1, wherein the first location of the first vehicle is received from a geolocation arrangement comprised with the first vehicle.

6. The system according to claim 1, wherein the first and the second vehicle are working machines.

7. The system according to claim 1, wherein the control unit forms part of a common server arranged remotely from the first and the second vehicle.

8. The system according to claim 1, wherein the control unit is provided as an onboard component of the second vehicle.

9. A work site arrangement, comprising:
   a computer system according to claim 1, and
   the first and the second vehicle.

10. A computer implemented method for preventing collisions between a first and a second vehicle operating at a work site, the first and the second vehicle arranged in communication with a control system comprising a control unit, wherein the method comprises:
   receiving, at the control unit, a first information package from the first vehicle, the first information package comprising an indication of a first location of the first vehicle, identifying a communication disruption between the first vehicle and the control unit, form, upon identification of the communication disruption, a permission zone for the second vehicle based on the first location of the first vehicle and a maximum stopping distance for the second vehicle, and transmitting a second information package to the second vehicle, the second information package comprising an instruction to the second vehicle for not entering the permission zone wherein the second vehicle is controlled to comply with the instruction by altering its route to avoid entering the permission zone, thereby restricting movement to avoid collision between the first and the second vehicle.

11. The method according to claim 10, further comprising:

identifying, using the control unit, a re-established communication between the first vehicle and the control unit, receiving, at the control unit, a third information package from the first vehicle, the third information package comprising an indication of a second location of the first vehicle, determining, using the control unit, a difference between the first and the second location for the first vehicle, transmitting, using the control unit and only if the determined difference is larger than a first threshold, a fourth information package to the second vehicle, the fourth information package comprising an instruction to allow the second first vehicle to enter the permission zone.

12. The method according to claim 10, wherein the communication disruption is identified by:

determining, using the control unit, a duration between two consecutively received indications of locations for the first vehicle, determining, using the control unit, if the determined duration is larger than a second threshold.

13. The method according to claim 12, wherein the second threshold is less than 1 minute.

14. A computer program product comprising a non-transitory computer readable medium having stored thereon computer program means for operating a control system for preventing collisions between a first and a second vehicle operating at a work site, the system comprising a control unit arranged in communication with the first and the second vehicle, wherein the computer program product comprises:

code for receiving, at the control unit, a first information package from the first vehicle, the first information package comprising an indication of a first location of the first vehicle, code for identifying, using the control unit, a communication disruption between the first vehicle and the control unit, form, upon identification of the communication disruption, a permission zone for the second vehicle based on the first location of the first vehicle and a maximum stopping distance for the second vehicle, and code for transmitting a second information package to the second vehicle, the second information package comprising an instruction to the second vehicle for not entering the permission zone wherein the second vehicle is controlled to comply with the instruction by altering its route to avoid entering the permission zone, thereby restricting movement to avoid collision between the first and the second vehicle.

* * * * *